Jan. 26, 1937.  A. L. LEE  2,068,862
CHAIN LINK CONNECTION
Filed April 5, 1935
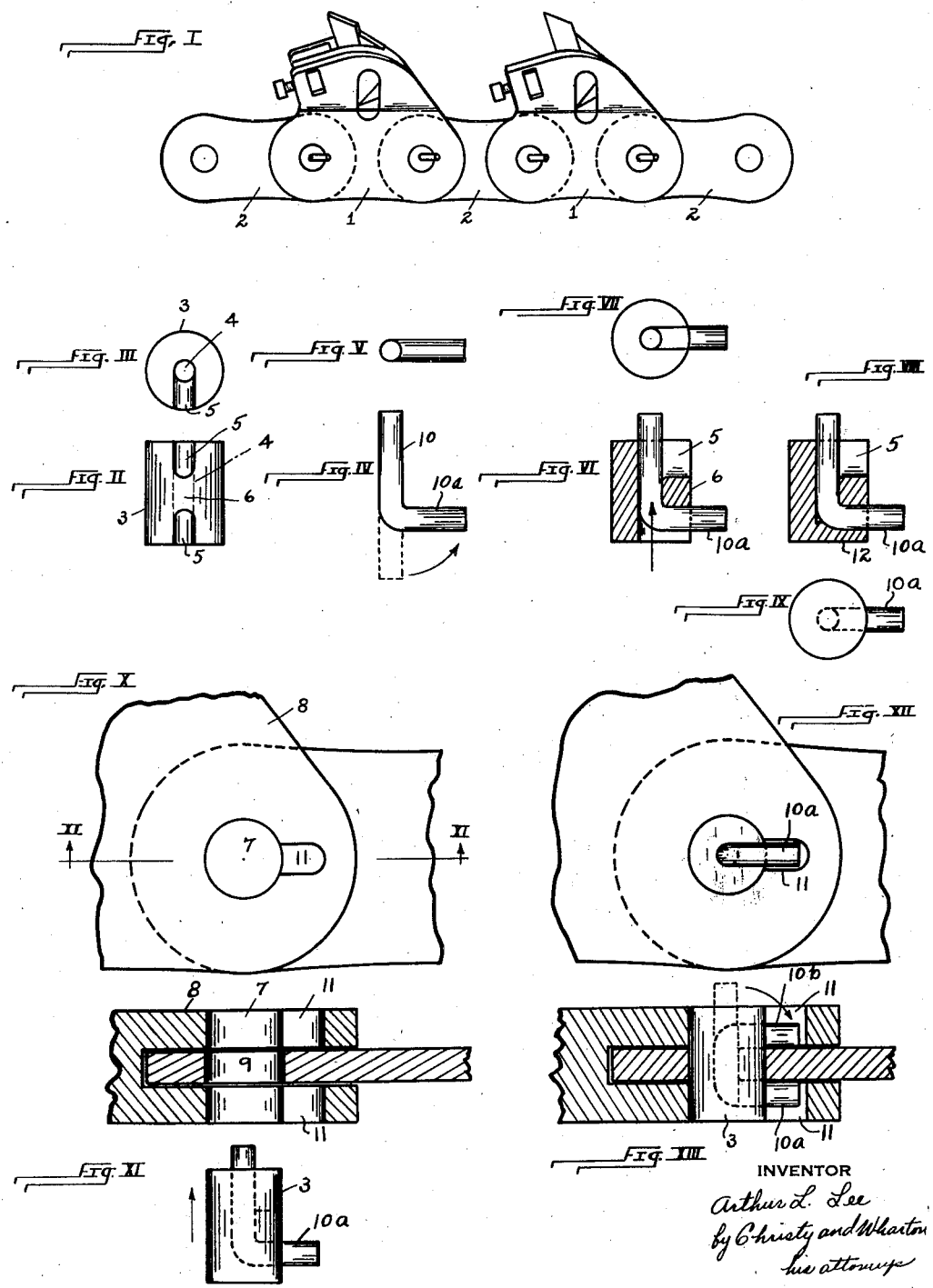
INVENTOR
Arthur L. Lee
by Christy and Wharton
his attorneys Registered Jan. 26, 1937

2,068,862

UNITED STATES PATENT OFFICE 2,068,862

CHAIN LINK CONNECTION

Arthur L. Lee, Oakmont, Pa.

Application April 5, 1935, Serial No. 14,873

6 Claims. (Cl. 74—251)

This invention relates to a pivot pin connection for interconnecting the yokes and eyes of adjacent links making up a travelling chain, and particularly to such connection as incorporated in a cutter chain adapted for cooperation with sprockets on the cutter bar of a kerf-cutting machine for use in coal mining. This constitutes a continuation in part of my co-pending application Serial No. 733,370, filed July 2, 1934.

In travelling chains generally, but particularly in cutter chains, the use of rivets to provide pivotal interconnection between links, is disadvantageous. In order that connecting pins may be riveted, it is necessary that they be unhardened or incompletely hardened. As a cutter chain is pulled through the work, there is upon the connecting pins a heavy shear stress, which the pins should be capable of enduring through long periods of time, without undergoing crystallization and breakage.

One object of my invention is, therefore, to provide a connecting link structure in which the connecting pin itself is made hard and wear-resistant, either by making the pin of a suitable alloy steel, or by subjecting the pin to a thorough hardening treatment.

Another object of my invention is to provide a pivotal connection between the yokes and eyes of a travelling chain which provides for the secure mounting of a hard, and undeformable, pivot pin to interconnect the cooperative eyes and yokes of adjacent links.

Another object of the invention is to so arrange the pivot pin and the connecting means therefor that an uninterrupted arcuate surface is presented to the yoke and eye interconnected by the pin in the forward segmental region of the pin lying toward the direction of travel of the chain.

Another object of the invention is to provide a hardened pin connection in which the operation of locking the pin in position is rendered simple, and may readily be performed.

In the accompanying drawing Fig. I is a side elevation of two links of a cutter chain such as is utilized in mining coal, showing the use of my special connection for interconnecting the links of the chain.

Fig. II is a detail elevation of the connecting pin proper, made in accordance with my invention.

Fig. III is a top plan view of the connecting pin shown in elevation in Fig. II.

Fig. IV is a detail elevation of the pin locking member of the connecting assembly, showing the locking member prepared for use.

Fig. V is a plan view of the locking member shown in Fig. IV.

Fig. VI is a central, vertical section through the connecting pin, showing the locking member as initially positioned therein.

Fig. VII is a top plan view of the connecting pin with the locking member initially positioned therein.

Fig. VIII is a central, vertical section through the assembly of connecting pin and locking member, illustrating a preferred preparation of the pin and locking member for insertion into the matching holes in a cooperating yoke and eye on adjacent chain links.

Fig. IX is a bottom plan view of the assembly shown in Fig. VIII.

Fig. X is a fragmentary detail showing in side elevation a yoke and eye on adjacent links arranged to be interconnected by a pin assembly such as that shown in Fig. VI or Fig. VIII.

Fig. XI is a horizontal, sectional view taken on the line XI—XI of Fig. X, and showing additionally a locking pin assembly prepared as in Fig. VIII brought into alignment with the matching openings in the yoke and eye.

Fig. XII is a view similar to Fig. X, but showing the locking pin assembly positioned in the matching holes of the yoke and eye.

Fig. XIII is a view in horizontal section taken centrally through the connecting assembly of Fig. XII.

Referring to Fig. I of the drawing the bit-carrying links 1 are therein shown as of the structure disclosed in my co-pending application Serial No. 733,370, of which this is in part a continuation. As shown, these bit blocks 1 are formed to embrace the terminals of relatively thin connecting links 2, both the bit-carrying links and the connecting links being provided with aligned pin holes for their pivotal interconnection. It should be understood, however, that my improved connecting pin structure may be utilized with particular advantage in any cutter chain assembly in which pivotal connection is to be established through aligned holes in cooperating yokes and eyes, and may also be employed with advantage in travelling chains adapted for purposes other than the performance of cutting operations.

Referring particularly to Figs. II and III of the drawing, the connecting pin 3 is a cylindrical, steel body, which is either subjected to some extreme hardening treatment, or which is made of an alloy, or metal, initially possessing hardness to a high degree. Extending longitudinally through the pin 3, and desirably made concentric with the central axis of the pin, is a bore 4, which is, as shown, of substantial diameter with respect to the diameter of the pin. At its plane terminal faces, the pin is slotted radially from its peripheral face inwardly to the bore 4. As shown, these radial slots 5 are both of substantial depth, being desirably of a depth exceeding the diameter of the bore 4. Between them there lies a region 6 of the pin, in which the peripheral surface of the pin is uninterrupted. While not essential for some purposes, for use in a cutter chain it is desirable that the slots 5 of the pin be disposed in longitudinal alignment with each other.

In utilizing the pin to interconnect chain links, it is passed through the two aligned pin holes 7 in a yoke, or yoke element, 8 in one of the connected links, and through the eye opening 9 in a link, or link element, which has been brought into alignment with the two openings 7 of the yoke element 8. As so positioned the hardness and strength of the pin enables it to resist wear and stresses, attendant upon the pull of the chain in use, and the pivotal movement of the connecting links relatively to each other. Because of the higher inherent qualities of the material of which it is made, the connecting pin 3 is, therefore, capable of much longer life than a pin of softer material, susceptible of upsetting after its introduction into the aligned openings of the links. The pin 3 being headless, and not being susceptible of upsetting, special means must be provided for locking it in position.

The locking means for the pin cooperate with the structural arrangement of the pin and with the yoke elements of the connection, to hold the pin both against longitudinal movement and against turning movement. The locking means comprise primarily a wire 10 which is of relatively great diameter, and which is of a tough material of relatively deformable nature, such as wrought iron or mild steel.

Before insertion into the bore 4 of the connecting pin, locking wire 10 is desirably bent, so that one leg 10a of the wire extends at right angles to the shank of the wire. When, then, the shank of the wire is inserted into the bore 4 of the pin, the angular extension 10a may be brought into register with one of the slots 5, to lie in the slot inwardly of the terminal surface of the connecting pin, and to extend radially beyond the peripheral surface of the connecting pin.

In each of the yoke elements 8, there is formed a relatively deep recess 11, which extends radially from the connecting pin opening 7 of the yoke element. When, then, a connecting pin is inserted into the matching openings 7 and 9 of the yoke elements and the eye element, respectively, the portion of the angular extension 10a, lying beyond the peripheral face of the connecting pin 3, is brought to register with, to be received in, the recess 11 in the adjacent yoke element 8.

With the assembly so far made, the links are laid upon their sides upon a suitable die, or anvil, shaped to support the angular extension 10a in the recess 11 in which it lies. The projecting portion of the wire 10 is then forced over, as by peening, to extend at right angles to the shank similarly to the portion 10a. In so doing, the slot 5 at this end of the pin being in alignment with the recess 11 of the yoke element at the exposed side of the link, the radially extending region of this deflected portion 10b lies similarly in its associated recess 11, so that the connecting pin is engaged to both of the yoke elements 8.

As so mounted, wire 10 embraces the longitudinally central region 6 of the connecting pin, and lies wholly within the side faces of the yoke-carrying link. As the angularly extending portions, or legs, 10a or 10b of the wire extend through the slots 5 of the connecting pin and into the recesses 11 of the yoke elements, they prevent turning movement of the connecting pin with respect to the yoke elements, as well as preventing longitudinal shifting of the connecting pin. It will be noted from Fig. I of the drawing that the recesses 11, carried by the yoke elements of the bit-carrying links 1, extend rearwardly with respect to the direction of travel of the cutter chain. In a cutter chain, in which the pull of the chain at each of its pivotal connections is severe, and in which during the performance of actual cutting work the pulling effect is also accomplished by a pivotal movement around the connecting pin, it is of importance that the segmental region of the connecting pin, in which its periphery is uninterrupted, be forwardly presented. The positioning of the recesses 11, and the fact that the connecting pin is locked in position by engagement of the wire in them and in the slots 5, insures that the uninterrupted surface of the connecting pin be at all times forwardly presented.

Figs. VIII and IX of the drawing illustrate a modification serving materially to facilitate the making of a pivotal connection by means of the connecting pin. As shown in these figures of the drawing, the wire 10, the one portion 10a of which has been angularly deflected, is brought into the position shown in Fig. VI of the drawing. In this position, a filling weld 12 is made over and around the leg 10a of the wire 10, to completely fill the slot 5 of the connecting pin in which it lies, forming an uninterrupted plane surface of the connecting pin at this end.

With the connecting pin so prepared for insertion, the radially extending portion of the leg 10a is caused to lie in its associated recess 11, with the other terminal of the wire projecting at the opposite face of the yoke-carrying link. The initial welding at the deflected terminal of the wire thus provides a fixed base for the wire, against which the operation of forcing over the opposite end of the wire to form the leg 10b may be performed. This allows the connecting operation to be performed against any suitable plane surface, and avoids the necessity of providing a specially shaped die, or anvil, for backing the leg 10a, and maintaining it in proper position, during the operation of deflecting the opposite end of the wide to form the leg 10b lying in its associated slot 5 and recess 11.

My improved chain link and connection provides, by means of simple elements, a connection which is of long life, greatly decreasing the frequency with which cutter chains, and similar chains, must be repaired. Further, if substitution of a link of the chain is to be made, the operation of removing pins, in order that the link may be taken out of the chain, is greatly facilitated as compared with the removal of a riveted link connected in the chain by means of a riveted pin. In order to remove a chain link, it is merely necessary to cut through the soft wire 10 at the base of one of the angularly extending portions, or legs, of the wire. The pin will then fall, or may be pushed, from its interconnecting position. If the weld 12 be provided at one end of the connecting pin, the angular leg at the other end of the connecting pin is none the less exposed, and may be readily cut through for removal of the pin.

Because of the relative softness of wire 10, an unwelded leg of the wire may alternatively be returned into axial line with the shank of the wire, by use of an appropriately shaped tool placed at the bend in the wire. The same force, applied at this region of the wire, serves to drive the pin from its inserted position, and straightens the obstructing leg of the wire to permit the pin to be driven out.

I claim as my invention:

1. In combination with two chain links, the first of which links has spaced leg portions defining a recess, and the second of which links is received within the recess defined by said leg portions, the said leg portions of the first link and the second having aligned apertures and the said leg portions having cut-out regions extended into the leg portions from said recess and converging with the apertures in the said leg portions, a bored connecting pin lying in the aligned apertures in the leg portions of the first link and in the second link lying between the said leg portions, and a deformable wire in the bore of the connecting pin and deflected at two points to extend angularly to the pin bore and beyond the periphery of the pin, whereby the deflected portions of the wire may lie in the cut-out regions in the leg portions of the first link in contact with the surfaces of the second link lying in the recess between the said leg portions.

2. A chain link connection in accordance with the combination of claim 1, in which the deflected portions of the wire project beyond the periphery of the connecting pin at such points that in contact with the surfaces of the said second link in the recess between the spaced legs of the said first link their axes may lie parallel to the surfaces of the said second link and perpendicular to the bore of the pin.

3. The combination with a chain link divided at one end to provide a yoke having a recess and leg portions bounding the recess and a cooperative link adapted to enter the recess of the yoke and to be embraced by the leg portions of the yoke, said yoke and embraced link having therein perforations adapted to match in assembly for cooperative reception of a connecting pin and the leg portions of the yoke being slotted through in regions extended from the pin-receiving openings therein, a bored connecting pin having at its ends slots extended from the pin bore to the peripheral surface of the pins, and a deformable wire extended through the bore of the connecting pin and intermediately deflected at two points to extend angularly to the bore of the pin and to lie in the end slots of the pin and the through-slots in the leg portions of the yoke in contact with the sides of the embraced link.

4. A chain link connection in accordance with the combination of claim 3, in which the end slots of the pin have a depth longitudinally of the pin substantially equal to the thickness of the leg portions of the yoke.

5. A chain link connection in accordance with the combination of claim 3, in which the bored connecting pin and deformable wire constitute a preformed assembly in which one angularly deflected portion of the wire has welded integration with the connecting pin in an end slot thereof.

6. A preformed connecting pin assembly comprising a bored cylindrical hard metal body having at its ends slots extended a substantial distance longitudinally of the body and extended from the pin bore to the peripheral surface of the pin, and an L-shaped piece of deformable wire having one leg thereof in an end slot of the pin and integrated with the pin body and having its second leg in the pin bore and extended beyond the end of the pin body opposite that at which the first-named leg of the wire is integrated.

ARTHUR L. LEE.